United States Patent
Hanson et al.

(10) Patent No.: US 8,623,119 B2
(45) Date of Patent: Jan. 7, 2014

(54) COMPRESSOR LUBRICANT RECLAIMING PROCESS AND SYSTEM

(76) Inventors: Daryl W. Hanson, San Antonio, TX (US); David R. McCaslin, San Antonio, TX (US); Robert M. Kranz, San Antonio, TX (US)

( * ) Notice: Subject to any disclaimer, the term of this patent is extended or adjusted under 35 U.S.C. 154(b) by 420 days.

(21) Appl. No.: 12/901,740

(22) Filed: Oct. 11, 2010

(65) Prior Publication Data
US 2011/0088555 A1 Apr. 21, 2011

Related U.S. Application Data

(60) Provisional application No. 61/252,046, filed on Oct. 15, 2009.

(51) Int. Cl.
*B01D 19/00* (2006.01)

(52) U.S. Cl.
USPC .............. 95/39; 95/266; 55/421; 55/DIG. 17; 96/193

(58) Field of Classification Search
None
See application file for complete search history.

(56) References Cited

U.S. PATENT DOCUMENTS

| | | | | |
|---|---|---|---|---|
| 2,341,430 A * | 2/1944 | Elsey | ................. | 62/77 |
| 2,702,826 A * | 2/1955 | Etherington et al. | ......... | 210/648 |
| 2,793,751 A * | 5/1957 | Broidrick | ...................... | 208/188 |
| 2,900,801 A * | 8/1959 | Honegger | ........................ | 62/84 |
| 3,215,623 A * | 11/1965 | Hix | ................................ | 210/671 |
| 3,272,735 A * | 9/1966 | Schnelder | ...................... | 208/341 |
| 5,171,455 A * | 12/1992 | Wang et al. | ................... | 210/744 |
| 5,314,613 A * | 5/1994 | Russo | ............................ | 208/184 |
| 8,128,737 B2 * | 3/2012 | Lomax et al. | ................... | 95/159 |
| 2004/0065110 A1 * | 4/2004 | Barratt et al. | ................... | 62/471 |
| 2007/0163840 A1 * | 7/2007 | Sekiya et al. | ................ | 184/6.16 |

* cited by examiner

*Primary Examiner* — Duane Smith
*Assistant Examiner* — Pankti Patel
(74) *Attorney, Agent, or Firm* — Bushman & Associates, P.C.

(57) ABSTRACT

A system and method for reclaiming compressor lubricants wherein a gas stream containing a lubricant contaminant is compressed to produce a compressed gas stream containing lubricant, the compressed gas stream being separated to produce a lubricant stream containing contaminant, the lubricant/contaminant stream being sent through a separator wherein the contaminant is separated from the lubricant.

9 Claims, 1 Drawing Sheet

COMPRESSOR LUBRICANT RECLAIMING PROCESS AND SYSTEM

CROSS REFERENCE TO RELATED APPLICATION

This application claims the priority of U.S. Provisional Application No. 61/252,046 filed on Oct. 15, 2009, the disclosure of which is incorporated herein by reference for all purposes.

FIELD OF THE INVENTION

The present invention relates to refinery, chemical plant and similar industrial processes, employing compressors, and more particularly, to a lubricant reclaiming process and system for use with compressors, typically flooded screw or liquid ring type, employed in such processes.

BACKGROUND OF THE INVENTION

Description of the Prior Art

In all refinery operations, numerous processes are employed. Non-limiting examples of such processes include crude distillation, hydrotreating, isomerization, catalytic reforming, hydrocracking, fluid catalytic cracking, alkylation etc. In some, and typically all of these processes, a light fraction (e.g., a gas stream) may be produced. While some components of the gas stream are undesirable (i.e., waste gases), many of those gases contain valuable products (e.g., methane, ethane, propane, etc.), which need to be recovered.

In typical refinery operations, gas streams, from whatever upstream process, are usually compressed and then sent for further processing. As is well known to those skilled in the art, compressors like other rotating machinery, require careful lubrication to prolong the life and ensure efficient operation. Lubricant, used to lubricate the compressor, and the gas stream being compressed discharges from the compressor as a lubricant/compressed gas stream. This stream is sent to a separator to remove the compressed gases from the recycled lubricant. Compressor refinery operations such as the processes noted above are complex and it is not uncommon for abnormal operations (so-called upsets) to occur. A typical upset can result in a given stream being contaminated with unwanted components. For example, as it pertains to one aspect of the present invention, upsets in upstream refinery operations can result in carry over of so-called light naphthas, which are generally speaking, a mixture comprising mainly straight-chain and cyclic aliphatic hydrocarbons having from about five to about nine carbon atoms per molecule. Accordingly, when an upset occurs, the gas stream will contain light naphtha which cannot exit with the compressed gases and will accumulate in the lubricant circuit. It will be understood that the reference to the light naphtha is by example only, since there may be cases when even heavier molecules are entrained in the incoming gas stream. In any event, when this gas stream containing light naphtha is compressed, the lubricant can become contaminated with the light naphtha. In this regard, while the compressed gas/lubricant discharged from the compressor can, as noted above, be readily separated into compressed gases and lubricant, prior art systems do not separate the light naphtha or similar materials from the lubricant. Accordingly, after the separation process, the lubricant as it recycles to the compressor contains light naphtha. As will be readily understood, light naphtha lowers the viscosity of the lubricant, interfering with the function of the lubricant which in turn results in failure, or at least reduced reliability and life, of the seals and/or bearings in the compressor.

SUMMARY OF THE INVENTION

In one aspect, the present invention relates to a process for recycling a lubricant used to lubricate a compressor.

In another aspect, the present invention relates to a process for compressing gases using a compressor.

In still another embodiment, the present invention relates to a system for recycling lubricant to a compressor.

DESCRIPTION THE PREFERRED EMBODIMENTS

While the present invention will be described with particular reference to refinery processes, it is to be understood that it is not so limited. The process and system of the present invention can be employed in any industrial environment where a compressor is handling gas streams from upstream processes and wherein the gas stream contains components that must also be removed from the lubricant used to lubricate the compressor. The terms "contaminant" or "lubricant contaminant" is used herein to refer to any substance in a compressor lubricant which deleteriously affects its properties in anyway such as lowering viscosity, decreasing lubricity, etc.

Figure 1:
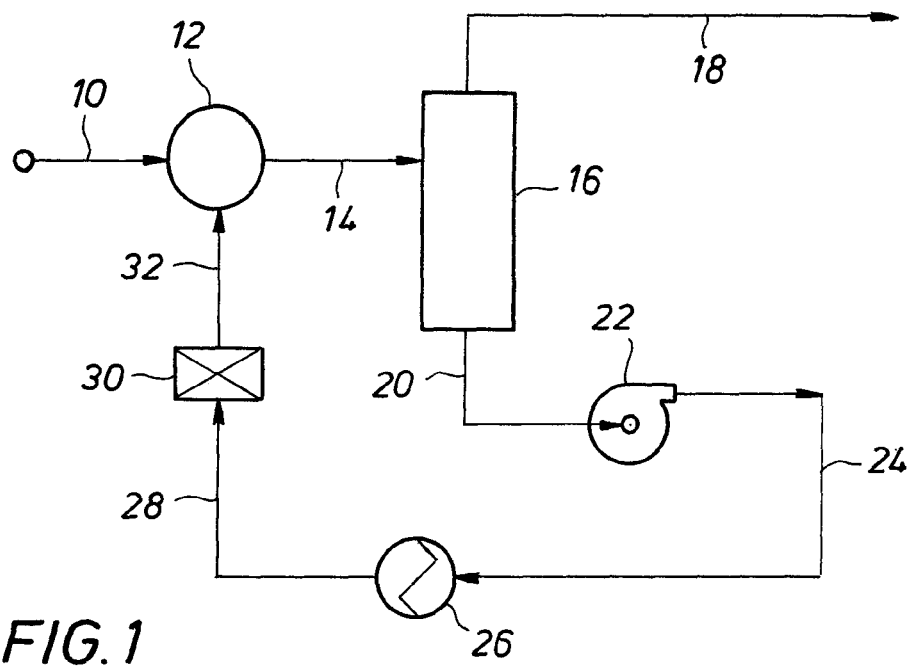
FIG. 1 is a typical, prior art process flow diagram showing a compressor in combination with a lubrication or lubricant circuit.

Referring then to FIG. 1, there is shown a typical prior art process comprising three circuits: a gas circuit, a gas/lubricant circuit, and a lubricant circuit. A gas stream comprising low to mid pressure gases via line 10, enters the suction side of compressor 12, where it is compressed and discharged into line 14 as a compressed lubricant/gas stream. The compressed lubricant/gas stream is sent via line 14 to separator 16 where an overhead, compressed gas stream is removed via line 18 and a lubricant stream is removed via line 11 and pumped by lube pump 22 to utility cooler 26 via line 24, filter 30 via line 28, and then returned to compressor 12 via line 32. It can be appreciated from the description above that the gas circuit comprises lines 10 and 18, the gas/lubricant circuit comprises line 14 and the lubricant circuit comprises lines 20, 24, 28 and 32.

As noted above, it is not uncommon, particularly in refinery operations, that upsets in various upstream units or processes occur. In many instances, such upsets result in the carry-over in the gas streams of contaminants having a lower boiling point and/or lower specific gravity and/or less viscosity than the lubricant, deleteriously affecting the lubricating ability of the lubricant. For example, assuming that a typical gas stream, which may be comprised of many gas streams from many upstream processes, is being handled by compressor 12 and ideally the gas stream comprises non-hydrocarbons and hydrocarbons in the range of $C_1$ up to about $C_5$. If an upset occurs upstream from compressor 12, the gas stream in line 10 entering the suction side of compressor 12 may contain hydrocarbons (e.g., light naphtha) that have higher boiling points than the gases but lower boiling points than the lubricant. The problem with these higher hydrocarbons (light naphtha) is that in the process shown in FIG. 1, rather than being removed as an overhead or even an intermediate fraction in separator 16, they exit separator 16 together with the lubricant stream in line 20 from the bottoms of separator 16 and are returned to compressor 12. As noted, these naphtha type hydrocarbons reduce the viscosity and lubricating characteristics of the lubricant, which in turn results in the seals and bearings in the compressor failing or at least having a reduced life span. It is the goal of the present invention to minimize, if not eliminate, this problem.

Figure 2:
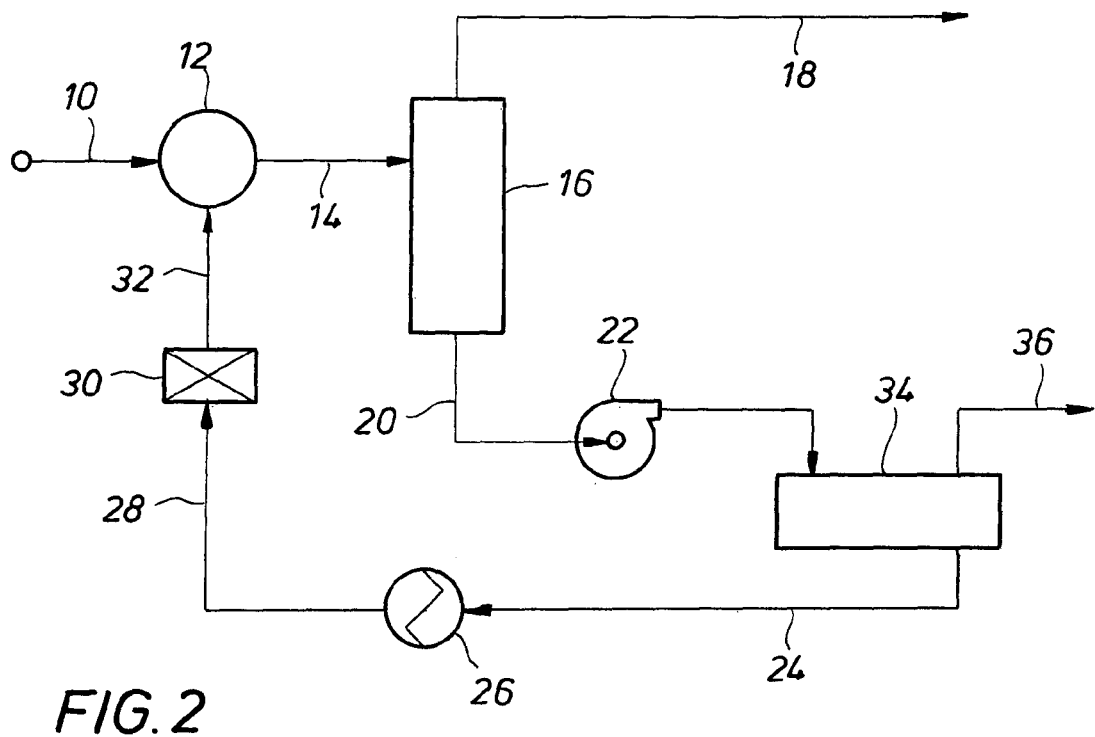
FIG. 2 is a view similar to FIG. 1 but showing one embodiment of the process of the present invention.

Referring then to FIG. 2, the process flow scheme shown in FIG. 1 is modified by the addition of liquid/liquid separator 34. Thus, rather than the naphtha type hydrocarbons, which have accumulated in the lubricant, being recycled to compressor 12, they are removed. To accomplish this, the output from lube pump 22 is fed to liquid-liquid separator 34 wherein these naphtha type hydrocarbons, including so-called "wild material", is removed as a light hydrocarbon stream via line 36. This light hydrocarbon stream can be further treated, if necessary, to recover valuable products and further processed.

The net result of the process depicted in FIG. 2, is that the lubricant returned to compressor 12 is substantially free of any component that interferes with the properties and purpose of the lubricant as discussed above.

Separator 34 can take many different forms, the goal being to use a separator or separator technology in which the light hydrocarbons or fraction (including entrained gases) can be separated from the lubricant. The liquid/liquid separators used in the process and system of the present invention can include entrainment separators, coalescers and coalescing filters, liquid/liquid centrifugal separators, liquid/liquid membrane separators, etc. depending upon the nature of the contaminant vis-à-vis the lubricant. It is also possible, again depending upon the nature of the contaminant to employ extraction technology to separate the contaminant from the lubricant.

While in the process and system described above, the reclaimed lubricant is recycled to the compressor in a closed loop system, it will be understood that the reclaimed lubricant can simply be recovered. For example, if it was desired to further treat the lubricant for some reason, it could be recovered, treated and then returned to the compressor loop.

While in the process described above, a single compressor and its associated lubricant circuit has been described, it will be understood by those skilled in the art, that the process could involve multiple compressors and lubricant circuits. The process of the present invention is particularly suited to liquid ring and flooded screw compressors. In the latter, the lubricant is used to bridge the space between the rotors to provide a hydraulic seal and transfer mechanical energy between the driving and driven rotor.

In experimental testing, it has been shown that when using the process depicted in FIG. 1 (i.e., the prior art process), run times are limited to hours or days before remedial action is required to avoid damage to the compressor components. By utilizing the process of the present invention as depicted in FIG. 2, run times have been extended to weeks or years.

In actual plant operations it was found that with the prior art system as depicted in FIG. 1 the reclaimed lubricant specific gravity varied between 1.085 and 1.04, typically 1.07±0.02. Using the process of the present invention as depicted in FIG. 2, the reclaimed lubricant almost consistently had a specific gravity of 1.095±0.003, and in fact the lowest specific gravity observed was 1.085.

A surprising result of the process of the present invention is that the light hydrocarbon fraction separated from the lubricant (e.g., in separator 34), not only contains liquid hydrocarbon, but traces of entrained gases as well. This is particularly important since the presence of gases in the recycled lubricant, as well as lowering viscosity of the lubricant can interfere with the compressor performance and reliability.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. In a process wherein a compressor is used to compress a first gas stream containing a compressor lubricant contaminant at a first pressure to produce a second gas stream at a second, higher pressure, said second gas stream comprising said contaminant and said compressor lubricant, said second gas stream being separated in a first separation zone into a third, substantially lubricant-free compressed gas stream and a reclaimed lubricant stream, the improvement comprising:

the compressor being used to compress a first hydrocarbon stream containing a compressor lubricant contaminant comprising a second hydrocarbon having a higher boiling point than said first hydrocarbon; and introducing said reclaimed lubricant stream leaving said first separation zone into a second separation zone comprising a liquid-liquid separation to remove said second hydrocarbon and produce a substantially second-hydrocarbon-free, reclaimed lubricant stream.

2. The process of claim 1, wherein said first gas stream comprises gaseous hydrocarbons.

3. The process of claim 1, wherein said second hydrocarbon comprises a material having a lower specific gravity than said lubricant.

4. The process of claim 1, wherein said lubricant contaminant is a liquid hydrocarbon.

5. The process of claim 1, wherein said first separation zone comprises liquid-gas separation.

6. The process of claim 1, wherein said compressor comprises a flooded screw compressor.

7. The process of claim 1, wherein said contaminant-free, reclaimed lubricant stream is recycled to said compressor.

8. The process of claim 1, wherein said first hydrocarbon comprises C1-C5 hydrocarbon.

9. The process of claim 8, wherein said second hydrocarbon comprises light naphtha.

\* \* \* \* \*